INVENTOR
Emile Plumat

BY *Spencer & Kaye*
ATTORNEYS.

INVENTOR
Emile Plumat

United States Patent Office 3,425,818
Patented Feb. 4, 1969

3,425,818
APPARATUS FOR SUPPORTING AND CONVEYING GLASS SHEETS ON A GAS SUPPORT BED
Emile Plumat, Gilly, Belgium, assignor to Glaverbel, S.A., Brussels, Belgium
Filed Jan. 11, 1965, Ser. No. 424,579
Claims priority, application Luxembourg, Mar. 6, 1964, 45,597
U.S. Cl. 65—182    7 Claims
Int. Cl. C03b 27/00

ABSTRACT OF THE DISCLOSURE

In the heat treatment of glass sheets, a method and means for supporting the glass sheets and heating them by means of an upward flow of turbulent gases, the turbulence of which assures that the glass sheets will be subjected to a uniform upward pressure, and uniform heating, over their entire surface area.

---

The present invention refers to a method of and an apparatus for supporting and conveying glass sheets while being heat-treated.

When a glass sheet is heat-treated by applying certain processes, such as when the glass is hardened or bent, or when inorganic enamels are fired thereon, it is necessary to heat the glass sheets up to a temperature which exceeds the transformation temperature of the material. In this state, the glass sheets easily become distorted. Moreover, great precautions must be taken for preventing the surface of the sheets from coming into contact with any body having the form and the qualities of a solid. These processes thus involve a fundamental difficulty consisting in constructing glass sheet conveying apparatuses which do not damage the glass sheets in the course of their being heat-treated.

Generally, the glass sheets are sustained in a vertical position by means of clips applied near one of their edges during such treatment. When the glass sheets are thus supported, however, they show characteristic distortions, where clipped, which impair the appearance of the glass.

It has also been suggested to convey the glass sheets in a horizontal position by supporting them at numerous points so as to reduce the unit pressure exerted by the glass upon each sustaining region. Although such apparatuses give rise to comparatively small distortions, these distortions greatly effect the quality of the glass sheet because they have an influence upon the whole surface of said glass sheet.

For conveying the glass sheets in a horizontal position, it has also been suggested to convey them by means of gas jets which are directed upwardly. The surface of said sheets is less damaged by applying this process but certain inconveniences cannot be eliminated. As the gas jets are localized, they can produce distortions at the places where they impinge on the glass sheets. Moreover, it is extremely difficult to get and hold the gas jets at the same temperature, so that differences of temperature between the different zones of the same sheet cannot be avoided. Such differences in temperature are detrimental to the glass sheet, because irregularly distributed tensile stresses are introduced into the sheet. For reducing the effect of such stresses, the glass sheets are supported by a large number of jets. This remedy, however, does not completely eliminate the difficulties mentioned above and results in appreciably complicating the construction of the apparatus.

The object of the present invention is to eliminate these difficulties by supporting the glass sheets, in the course of being heat-treated, by ascending gas streams. According to the present invention, the gases are put into turbulent motion in the course of their ascension. By so doing, the gases are intimately mixed and their temperature is consequently equalized over the area of the glass sheet.

Moreover, the gases continue to mix as when they flow along the surface of the glass sheets with the same equalizing effect upon the temperature of the latter. Finally, as the gases act approximately upon the whole surface of the glass sheets, the difficulties which arise due to individual jets impinging upon the surface of the glass sheets are thus eliminated.

It is advantageous that the temperature of the gases put into turbulent motion be regulated. By so doing, the glass sheets can either be rapidly cooled down or heated up to the desired temperature for heat-treating them. In this last case, and according to a particular method used for applying the process which is the subject of this patent, gases capable of releasing heat to the ascending gas streams, and of which the flow can be regulated, are preferably injected into the gas stream. Either combustible gases or gaseous combustion products are introduced in an adequate quantity into the gases in the course of their ascending motion. Owing to the fact that the gases are put into turbulent motion, temperatures rapidly equalize in the mass of the gases blown on the glass sheets, and differential heating of different zones of the glass sheets is consequently avoided.

A part of the gases put into turbulent motion can also be circulated by making them simultaneously pass over heating elements such as hot electric heating elements. By so doing, the nature of the gases flowing along the sheet glass does not undergo any chemical change when the temperature thereon rises.

A particular advantage of the process described is that the atmosphere of the heated enclosure can easily be controlled, especially when inorganic enamels are fired.

At least a part of the gases flowing along the glass sheets leaves the apparatus by passing through conduits, formed by those through which the ascending gas streams pass. According to the invention, a part of the exhaust gases are recirculated and mixed with the ascending gases, which are put into turbulent motion. The gases which have been blown on the glass sheet can be discharged and a part of the heat contained in them can be recovered. Consequently, it is particularly economical to heat-treat a glass sheet, owing to its being rapidly brought to the temperature desired.

It is advantageous to guide the glass sheets on both sides while they are supported at least partially by the gases. The sheets can be guided with a high degree of accuracy so that their faces do not come into contact with any solid guiding pieces which could damage the sheets.

Another way of applying the process according to this invention, consists in moving the glass sheets forward by simultaneously directing the gas streams in a preselected particular direction. It is thus possible to reduce to a minimum the friction force developed on the sides of the glass sheet and used for moving the latter forward. This advantage is particularly appreciated when the glass sheet is heat-treated at a temperature which considerably exceeds the transformation temperature as is the case when inorganic enamels are fired.

Another way of applying the process according to this invention consists in blowing gases on the upper surface of the glass sheet, said gases being at a temperature which can be regulated, so that by acting upon both surfaces of the glass sheet, it can be brought quickly to the temperature desired.

The invention also contemplates an apparatus for supporting and conveying glass sheets, which are sustained by ascending gas streams. According to the invention, said apparatus is equipped with devices for putting the gases, located under the glass sheet, into a turbulent and ascending motion for regulating the temperature of these gases and for laterally guiding the glass sheets. Such devices capable of putting the gases into a turbulent and ascending motion consist of airscrews located under the glass sheets in a plane which is approximately parallel to the glass sheets, each airscrew being surrounded by an concentric ring. This device is particularly capable of giving rise to swirls in an extensive gas stream so that the gas is intensively stirred up. Moreover, by using airscrews of large diameter, the glass sheet is supported by gas streams of large cross sectional dimensions. The difficulties due to very thin supporting gas jets locally impinging on the surface of the glass sheet are thus eliminated. On the other hand, by surrounding said airscrews with rings, a bigger quantity of gases blown on the glass sheet can be discharged through conduits. The gases can be thus quickly and intensively cooled down because in this case the recycling process and the recovery of heat are less important. The airscrews may be preferably arranged in distributed relation or in lines and rows.

As is well known, airscrews have the inherent property of producing an air or gas flow having a generally helical motion. In addition, at the edges of the stream flowing from an airscrew irregular motions, or eddies, are inevitably present. These inherent characteristics of airscrews are described, for example, in the texts Airscrews in Theory and Experiment, A. Fage (D. Van Nostrand Co., New York, 1920), pp. 31, and 34 to 36, and The Elements of Airfoil and Airscrew Theory, Herman Glauert (Cambridge at the University Press, 1947), pp. 209 and 210.

The distributed arrangement is advantageously used for rapidly heating the glass sheet, this being possible because of the reduced dimensions of the exhaust gases apertures between the rings of the airscrews. The reduced dimensions of said apertures facilitate the recycling process and the recovery of heat.

The arrangement in lines and rows is, on the contrary, used for rapidly cooling down the glass sheet, on account of the rather large dimensions of the exhaust gases apertures between the rings of the airscrews. The bigger surface of said apertures hinders in this case, to some extent, the recycling process and the recovery of heat. The glass sheet may be more intensively cooled down if higher rings are utilized when the arrangement in lines and rows is employed.

According to the invention, airscrews are fixed to the ends of gear shafts, driven by other gear shafts and powered by one or several motors. Consequently the zone below the plane containing said airscrews is freed from devices which are not used for modifying the temperature of the gases and the ascending gas streams as well as the exhaust gases flow more easily. It is advantageous that the speed of the motors may be regulated for suitably controlling the rotation speed of the airscrews. The fact that the gases are strongly stirred up contributes to equalizing the temperature of the glass sheets.

This device is preferred and leads to delimiting two zones, which are to be distinguished one from the other, namely: a heating zone and a cooling zone. The first one is equipped with two boxes, located respectively one to each side of the plane in which the glass sheets are displaced and includes, inside the lower box at least, devices for putting the gases in a turbulent and ascending motion as well as devices for regulating the temperature of the gases. The advantage of this system is that said glass sheet can be heat-treated by applying a continuous process, whereas the other process for heat-treating said glass sheet is discontinuous since it involves submitting the glass sheet to a complete heat treatment cycle while the glass sheet is held motionless.

According to the invention, the system is composed of conduits provided with orifices, placed under the airscrews and capable of delivering gases which may release heat.

By doing this, it is possible to bring directly under the airscrews gases at a controlled temperature and in a suitable quantity so that the temperature of said glass sheets can be accurrately regulated.

If the gases are heated by passing over heating elements before being used for heat treating said glass sheets, it is easy to control the atmosphere in which this heat treatment takes place.

In order to prevent the shattering of glass from causing trouble, when glass sheets break, wires or wire-nettings are stretched over airscrews and rings.

According to the invention, the glass sheet is guided and moved forward by two mechanisms which come into contact with the two edges of said glass sheet and which are parallel to the direction followed by the latter when it is moved forward. These transporting mechanisms are preferably belts mounted on idlers. For example, one of the belts permanently moves along the same path, whereas the path followed by at least one of the belts is so adjusted that said belt may come into contact with the opposite edge of the glass sheet. In order to achieve this result, the supports of this belt are made sliding and at least one of these supports is equipped so that it can receive a third belt moved by a fixed motor and capable of moving the second belt, which is to be adjusted to the width of the glass sheets. This marginal contact of the two first belts enables the glass sheet to move forward or to be stabilized as desired, without causing any damage to the main surfaces of said glass sheet. The contact pressure may even be extremely low by placing sheets adjustable in all directions over the airscrews and rings surrounding them. When said sheets are suitably adjusted in the desired direction, the glass sheet can be heat-treated in safety at temperatures considerably higher than the transformation temperature, without running the risk of damaging the area adjacent to the edges of the glass sheet which are parallel to the direction of the latter when it moves forward.

In order to regulate the temperature on the upper surface of the glass sheet, it is advantageous that the apparatus corresponding to the invention be equipped with mechanisms locate dover at least one part of the airscrews and capable of blowing downwardly a fluid whose temperature is controlled. These mechanisms are preferably airscrews and rings located over the plane in which the glass sheets are displaced, said airscrews and rings being capable of putting the gases in a turbulent motion when moving downwardly.

The temperature of these gases is regulated by introducing into them other gases capable of transferring heat to them, this transfer being done by means of conduits placed over the airscrews and in which orifices are drilled. When a coating is applied to the glass sheets, the high temperatures necessary for the inorganic enamels to be fired can be reached by this method of regulating the temperature of said gases, whereas less high temperatures, sufficient for heat-treating the glass sheets, can be maintained by adjusting the temperature of the gases coming into contact with the lower surface of the glass sheet.

The accompanying drawings show how the present invention can be applied.

These and other objects and advantages of this invention will become more apparent upon reference to the following specification taken in connection with the accompanying drawings, in which.

Figure 1:
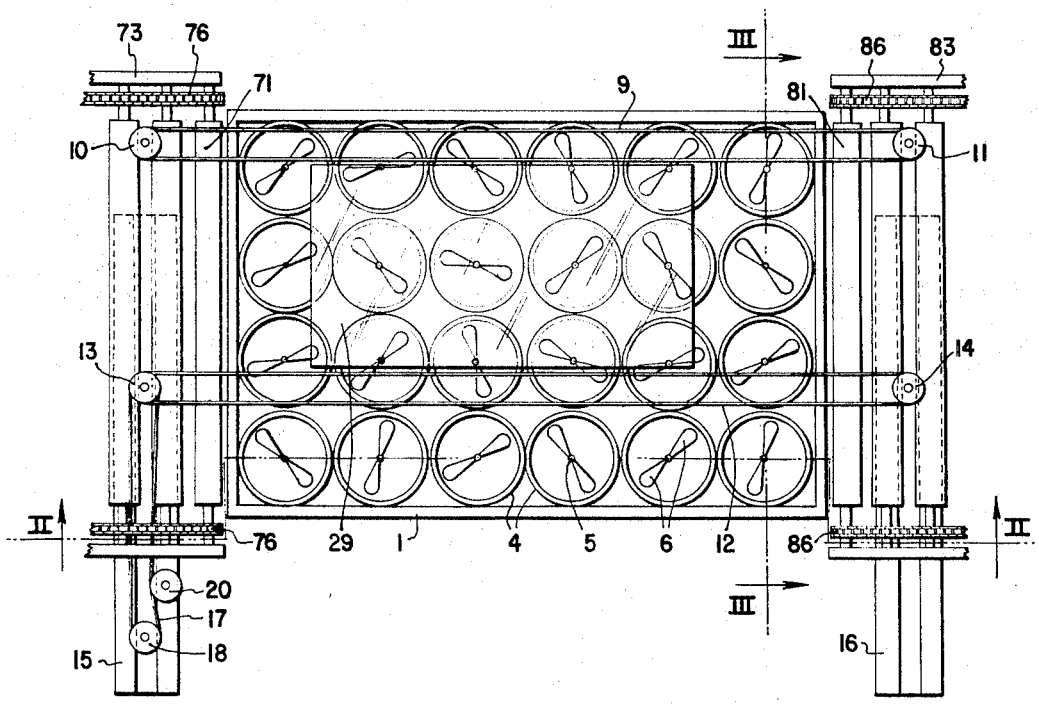
FIGURE 1 is a plan view of one form of the invention with the housing portion in section.
Figure 2:
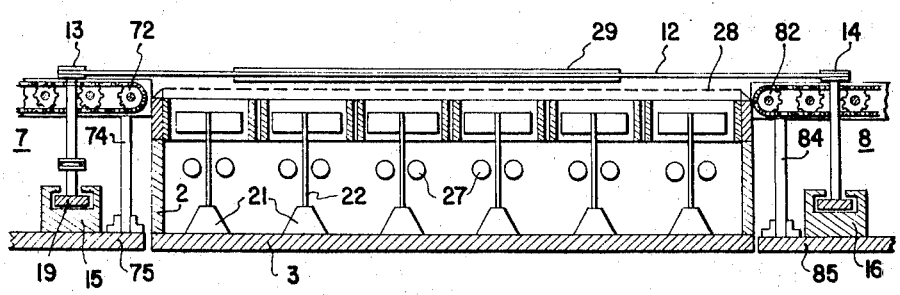
FIGURE 2 is a longitudinal section taken on line II—II of FIGURE 1.
Figure 3:
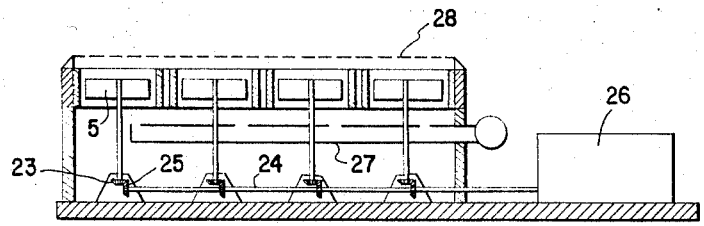
FIGURE 3 is a cross section taken on line III—III of FIGURE 1.

The apparatus, shown in FIGURES 1, 2 and 3, has a metal frame 1, which rests on supports 2, attached to the metal base 3. Rings 4, all of the same diameter and the same height, are fixed inside frame 1. A two-bladed airscrews 5, 6 is placed in each of said rings. So constructed, the complete apparatus has, in addition to this, a preheating compartment 7 and a glass sheet reception compartment 8, both along the axis of said metal frame 1. In preheating compartment 7 the glass sheets are conveyed on rollers 71 whose ends are provided with pinions 72.

These glass sheet conveying rollers 71 are integral with a frame 73 which lies on supports 74 fixed to metal base 75. Said glass sheet conveying rollers 71 are driven by two sprocket chaims 76 which rotate the pinions 72. For preheating compartment 7, various well known means may be used, such as heat radiating elements.

When they are ejected from the apparatuses, the heat-treated glass sheets are received upon the glass sheet conveying rollers 81 of the glass sheet reception compartment 8. These glass sheet conveying rollers 81 and those of the preheating compartment are mounted on a frame 83 lying on supports 84 fixed to metal base 85. Pinions 82 are fixed to the ends of the glass sheet conveying rollers 81 of glass sheet reception compartment 8. Two sprocket chains 86 rotate the pinions 82 by which said glass sheet conveying rollers 81 in their turn are driven.

For guiding the glass sheets in the course of their displacement over metal frame 1, an endless belt 9 is placed on one of the edges of frame 1. This belt 9 passes over two sheaves 10 and 11, of which the axes are respectively fixed to metal bases 75 and 85. The internal side of belt 9 can so be maintained in the same position near the edge of the frame. The second endless belt 12 also passes over two sheaves 13 and 14, of which the axes can move along two slide-ways 15 and 16, respectively fixed to metal plates 75 and 85. Belt 12 passes over one groove of two-grooved sheave 13, whereas endless belt 17 passes over the other groove of said sheave. Endless belt 17 passes then over a sheave 18 which is maintained at a constant distance by means of a spindle 19, also used as a slide. Belt 12 is driven by fixed sheave 20. This sheave is placed in such a way that it may tighten belt 17, depending upon the position of sheaves 13 and 18 in slideway 15. Boxes 21 are also fixed to frame 3 and are traversed by gear shafts 22, at the end of each of which is fixed an airscrew 5, disposed outside said boxes. A bevel gear 23 is fixed at the other end of each gear drive 22, which end is located inside said box 21. In this example of the invention, a set of airscrews is rotated by a common gear shaft 24 on which other bevel gears 25, also located inside the boxes, are fixed, said bevel gears 25 meshing with bevel gears 23. This gear shaft 24 can be driven at various speeds, which can be regulated by means of a motor variator set 26, schematically represented on the drawing:

FIGURES 2 and 3 also show gas burner manifolds 27 used for elevating the temperature of the ascending gas streams. These gas burner manifolds 27 can also be used for delivering, to beneath the airscrews, gaseous combustion products or gases previously passed over heating elements such as heat resistors contained in an enclosed space communicating with gas burner manifolds 27.

As shown on FIGURES 2 and 3, a metal wire-netting 28 is stretched immediately over airscrews 5 and rings 4. It lies on the edge of frame 1, which supports it. This safety device is capable of retaining the glass fragments if the glass sheet 29 happens to break.

Following is an example illustrating the operation of the system as it is applied to hardening glass sheets.

Glass sheets 29 with suitable dimensions are successively brought into the preheating compartment 7. Glass sheet conveying rollers 71 move each glass sheet 29 forward, so that its temperature gradually rises. Before glass sheet 29 penetrates into the glass heat-treating compartment over metal frame 1, sheaves 13 and 18 as well as sheave 14 are adjusted so that endless belts 9 and 12 come into light contact with the edges of glass sheet 29. At the moment when such a contact is made, arrangements have to be made for equalizing the linear speeds of glass sheet conveying rolers 71 and belts 9 and 12, so that the glass sheet 29 can be brought into the glass heat treating zone over metal frame 1 at a uniform speed. When leaving the glass preheating zone 7, where sheet 29 has been brought to a temperature slightly below the transformation temperature, glass sheet 29 loses the tangible, but non-dangerous, contact with glass sheet conveying rollers 71 and gradually glides on a cushion of gases, put into turbulent motion. The weight M2 of glass sheet 29 has to be duly considered when selecting the rotation speeds of airscrews 5, which speeds have to be regulated by suitably adjusting motor-variator set 26. By so gliding, glass sheet 29 is moved forward, over metal frame 1, by belts 9 and 12, which exert on the edges of said glass sheet 29 a very low contact pressure.

At the moment when glass sheet 29 is completely introduced in the heat-treating zone over metal frame 1, the temperature of the gases is elevated by increasing the flow of hot gases. By so doing, the temperature of glass sheet 29 rises above the transformation temperature up to the level desired for suitably heat treating said glass sheet 29 without running the risk of deteriorating the surfaces of it.

In this example of the present invention, glass sheet 29 is first brought to the required temperature and is then rapidly cooled down by modifying the temperature of the gases without previously conveying glass sheet 29 into another zone. According to the degree of hardening desired, more or less cold gas is injected with a view to cooling down said glass sheet more or less rapidly.

Whatever the cooling down process may be, it is however necessary that glass sheet 29 stay over metal frame 1 up to the moment when the glass sheet temperature reaches a level slightly below the transformation temperature. In fact, as soon as this temperature is reached, any risk of deteriorating the inner surface of glass sheet 29 by the latter coming into contact with any material body vanishes. It is only at this moment that the two belts 9 and 12 can move glass sheet 29 into the following 8 zone where it is received on glass sheet conveying rollers 81, on which it continues to cool down, so that the hardening of the glass can be completed.

Figure 4:
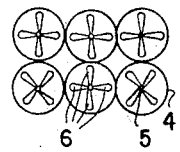
FIGURES 4, 5, 6 show different arrangements for the airscrews and guide rings.
Figure 5:
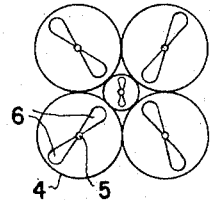
Figure 6:
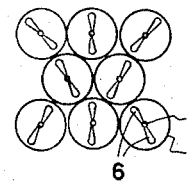

Examples of the arrangement of the airscrews of the present invention are shown in FIGURES 4, 5, and 6. FIGURE 4 shows rings 4 of different diameters, inside which two-bladed airscrews 5 and 6 rotate. Rings 4, which are of the same diameter and arranged in lines and columns, and inside which rings four-bladed airscrews 5 rotate, are shown in FIGURE 5, whereas FIGURE 6 shows rings 4 which are also of the same diameter but arranged in distributed relation and inside which two-bladed airscrews 5 and 6 rotate.

Figure 7:
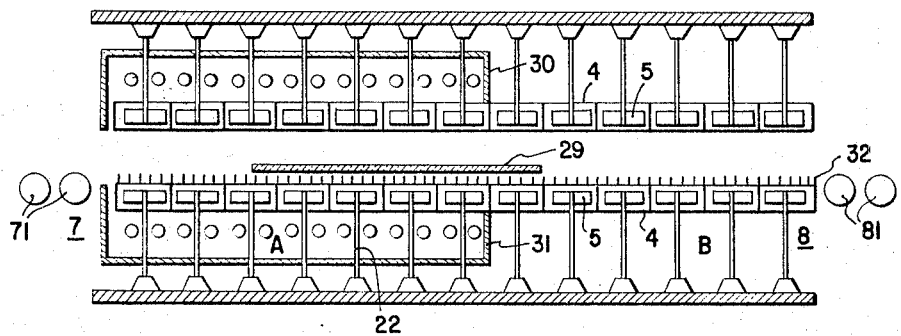
FIGURE 7 is a vertical section showing a glass sheet supported between two air streams.

Another example is finally shown in FIGURE 7. Letters A and B respectively designate the compartments where the glass is heat-treated and rapidly cooled down, numerals 7 and 8 designate the regions where the glass is preheated and received, respectively. In glass heating compartment A, airscrews 5 and rings 4 are surrounded by two closed boxes 30 and 31 traversed by gear shafts 22. Consequently, glass sheet 29 can be more rapidly and more economically brought to the temperature desired because the efficiency of the gas recycling process is noticeably improved by boxes 30 and 31, which results in the losses of heat being strongly reduced.

On the other hand, glass sheet 29 after being heated to the desired temperature is moved into compartment B, where it rapidly cools down in a way which has been above described. The speed of belts 9 and 12 can be modified as may be necessary to control the rate of movement of the sheet.

Glass sheet 29 can also be moved by inclining sheets 32, adjustable in all directions. Such sheets can be adjusted by utilizing a well known mechanism, not shown on the drawings. When glass sheet 29 is heat-treated and rapidly cooled down, sheets 32 are approximately in a vertical position. When said sheets 32 make an angle with the horizontal plane, a more or less intensive pressure is exerted on glass sheet 29. Consequently, the marginal contact pressure of belts 9 and 12 when glass sheet 29 moves forward, becomes extremely low. Such sheets 32 can also retain glass fragments if glass sheet 29 breaks. The system leads to considerably improving the productivity of the equipment in the case of a continuous production and, in addition to this, to increasing the thermic efficiency of the plant.

It is understood, that the present invention is not limited to the examples, which have been described and are not to be considered as exhaustive. Modifications thereto can be made, which remain in the scope of said invention.

What is claimed is:

1. In apparatus for supporting and conveying glass sheets during the heat treatment thereof, the combination comprising:
   (a) a plurality of airscrews disposed adjacent one another, each said airscrew being positioned for creating a gas flow having a helical ascending motion in the same general direction as the gas flows created by the remainder of said airscrews, and the totality of said airscrews directing a generally turbulent ascending gas flow against the bottom surfaces of such sheets for supporting them;
   (b) gas guiding means disposed around said airscrews for forming gas guide ducts enclosing each said airscrew and for forming gas discharge ducts in regions between said airscrews;
   (c) sheet guiding means guidingly engaging at least one side edge of such sheet as it is supported by such ascending gas flow; and
   (d) means disposed beneath said airscrews for regulating the temperature of the gas delivered to said airscrews.

2. An arrangement as defined in claim 1 wherein said sheet guiding means are arranged for guidingly engaging both side edges of such sheet.

3. An arrangement as defined in claim 1 wherein said means for regulating the temperature comprise gas burner manifolds disposed beneath said airscrews for adjusting the temperature of the gas delivered to said airscrews.

4. An arrangement as defined in claim 1 further comprising protective wire screen means extending over said airscrews for protecting said airscrews from sheet fragments, said screen means having substantially no influence on the turbulent ascending gas flow produced by said airscrews.

5. An arrangement as defined in claim 1 further comprising adjustable gas flow guiding sheets disposed above said airscrews for adjusting the general direction of the gas flow produced by said airscrews, said sheets being spaced sufficiently far apart so as to have substantially no influence on the generally turbulent ascending flow produced by said airscrews.

6. An arrangement as defined in claim 1 further comprising means disposed over at least a portion of the path along which the glass sheets move for directing gas having a controlled temperature downwardly toward such path.

7. An arrangement as defined in claim 1 wherein said gas guiding means comprises a plurality of shroud rings each surrounding a respective airscrew.

References Cited

UNITED STATES PATENTS

| | | | |
|---|---|---|---|
| 3,048,383 | 8/1962 | Champlin | 65—182 |
| 3,217,421 | 11/1965 | Lowe et al. | 65—25 |
| 3,223,501 | 12/1965 | Fredley et al. | 65—25 |

DONALL H. SYLVESTER, *Primary Examiner.*

ARTHUR D. KELLOGG, *Assistant Examiner.*

U.S. Cl. X.R.

65—25, 114, 119, 350; 214—1